(12) United States Patent  (10) Patent No.: US 7,920,545 B2
Eguchi  (45) Date of Patent: Apr. 5, 2011

(54) COMMUNICATION APPARATUS, CONTROL METHOD FOR CONTROLLING COMMUNICATION APPARATUS, PROGRAM FOR CONTROLLING COMMUNICATION APPARATUS, AND STORAGE MEDIUM STORING SUCH PROGRAM

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/847,098

(22) Filed: Aug. 29, 2007

(65) Prior Publication Data

US 2008/0253354 A1  Oct. 16, 2008

(30) Foreign Application Priority Data

Sep. 1, 2006 (JP) ................. 2006-238169

(51) Int. Cl.
*H04J 3/06* (2006.01)
(52) U.S. Cl. ........ 370/350; 370/311; 370/328; 370/330; 370/395.62; 455/458; 455/502
(58) Field of Classification Search .................. 370/311, 370/328, 330, 350, 395.62; 455/458, 502
See application file for complete search history.

(56) References Cited

U.S. PATENT DOCUMENTS

| | | | |
|---|---|---|---|
| 5,235,406 A | 8/1993 | Ishii et al. | |
| 5,528,227 A | 6/1996 | Eguchi | |
| 5,539,687 A | 7/1996 | Torisawa et al. | |
| 5,708,402 A | 1/1998 | Hacshisu et al. | |
| 5,760,525 A | 6/1998 | Hacshisu et al. | |
| 5,815,055 A | 9/1998 | Eguchi et al. | |
| 5,917,850 A | 6/1999 | Fujita et al. | |
| 6,020,672 A | 2/2000 | Yokota et al. | |
| 7,231,221 B2 * | 6/2007 | Assarsson et al. | 455/458 |
| 2006/0072586 A1 * | 4/2006 | Callaway et al. | 370/395.62 |
| 2006/0164969 A1 * | 7/2006 | Malik et al. | 370/203 |
| 2006/0187866 A1 * | 8/2006 | Werb et al. | 370/311 |
| 2007/0042795 A1 * | 2/2007 | Mo et al. | 455/502 |
| 2008/0232286 A1 * | 9/2008 | Habetha et al. | 370/311 |

OTHER PUBLICATIONS

Standard ECMA-368 High Rate Ultra Wideband PHY and MAC Standard, 2nd ed., Dec. 2007, pp. i-viii and 1-330.

* cited by examiner

*Primary Examiner* — William Trost, IV
*Assistant Examiner* — Toan D Nguyen
(74) *Attorney, Agent, or Firm* — Fitzpatrick, Cella, Harper & Scinto

(57) ABSTRACT

A communication apparatus determines a hibernation period on the basis of the amount of an offset in beacon period start timing among multiple beacon groups. The communication apparatus is placed in a hibernation status in accordance with the determined hibernation period. Thus, an offset in beacon period start timing among the beacon groups that would occur while the device is in hibernation can be prevented and the need for merging beacon groups and decrease in data rate during such merging are prevented.

10 Claims, 15 Drawing Sheets

F I G. 12A
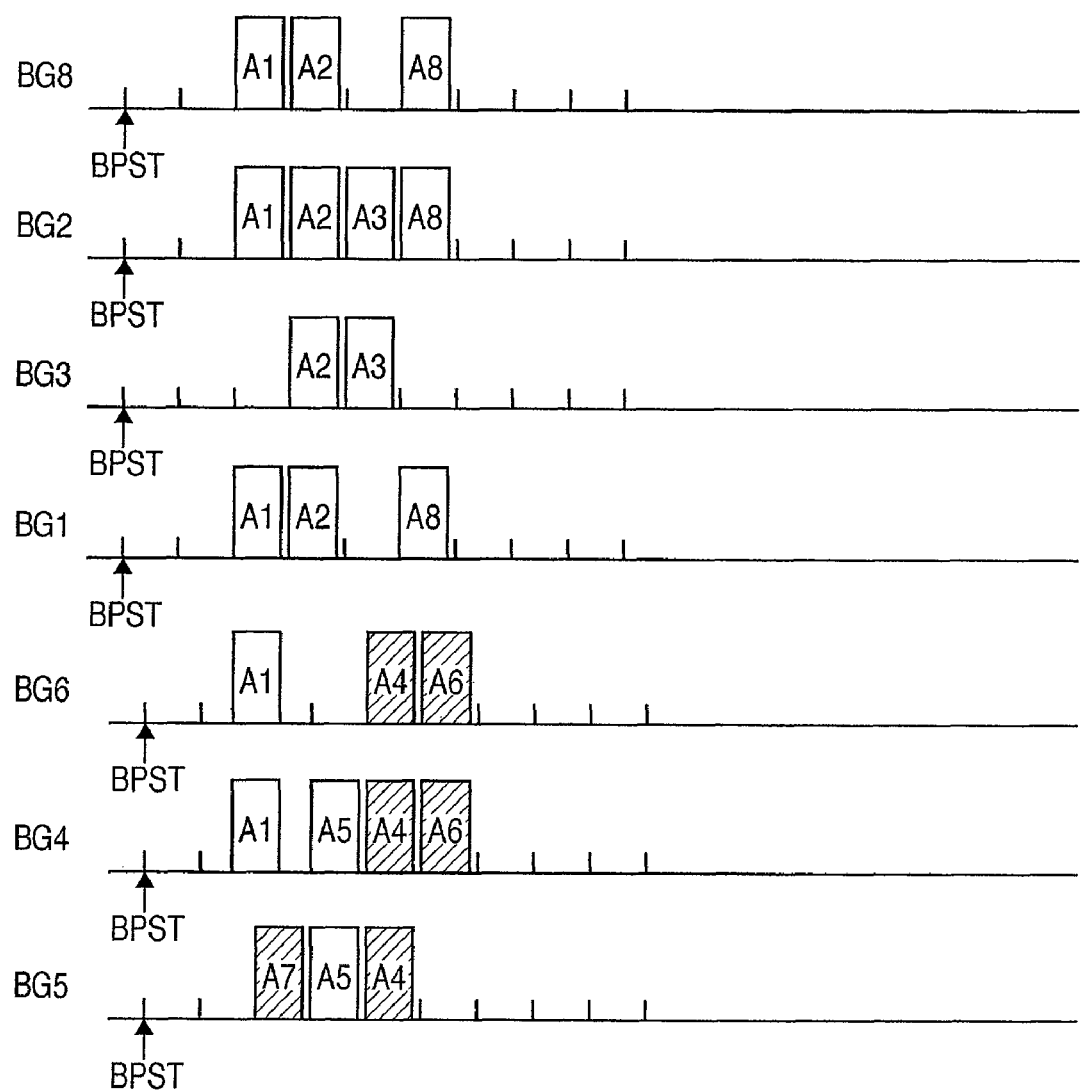

COMMUNICATION APPARATUS, CONTROL METHOD FOR CONTROLLING COMMUNICATION APPARATUS, PROGRAM FOR CONTROLLING COMMUNICATION APPARATUS, AND STORAGE MEDIUM STORING SUCH PROGRAM

BACKGROUND OF THE INVENTION

1. Field of the Invention

The present invention relates to a technique for determining a hibernation period of a communication apparatus.

2. Description of the Related Art

Wireless communication methods that perform independent distributed communication, such as WiMedia, have been proposed in recent years. WiMedia was standardized as Standard ECMA-368 (High Rate Ultra Wideband PHY and MAC standard) by the European Computer Manufacturers Association (ECMA). FIG. 7 shows an exemplary arrangement of beacon groups consisting of a WiMedia device and other, neighboring WiMedia devices. The WiMedia devices transmit beacons to and from one another within the beacon group and reserve their respective communication bands. Each device transmits a beacon in each beacon slot of a beacon band (beacon period) located in the first time period of a superframe having a predetermine time length as shown in FIG. 8. BG1 shown in FIG. 8 is a beacon group formed by device A1. BG2, BG3, BG4, . . . , BG8 are beacon groups formed by devices A2, A3, A4, . . . , A8 respectively. Beacons are transmitted by the devices with a time lag between the devices, because of variations in clock precision among the devices. Therefore, all devices are in accordance with the device whose superframe start time (Beacon Period Start Time, hereinafter referred to as BPST) is the latest to be synchronized with the other devices. Each device detects a Beacon Period Occupied Information Element (BPOIE) in a beacon transmitted by another device, and can identify a device in the beacon group of the device, based on the BPOIE thereof. Each device synchronizes with devices within a beacon group constituted by the device, and devices within a beacon group constituted by each device in the beacon group constituted by the device, namely an extended beacon group (EGB). For example, device A1 synchronizes with any of the beacon groups (BG2, BG4, BG6, and BG8) constituted by any of the devices (A2, A4, A6, and A8) within the beacon group to which device A1 belongs. The start time of a superframe of each device can be obtained by calculating the BPST from the sequential number of a beacon transmitted by the device (beacon slot number), and the time of reception of the beacon.

Portable apparatuses such as digital cameras and PDAs are becoming equipped with wireless devices in recent times. Such portable apparatuses in general are battery-powered and have stringent power-consumption requirements. Therefore, hibernation mode for reducing power consumption is an essential function for wireless communication.

Hibernation mode for reducing power consumption is provided in WiMedia as well. However, resynchronization after waking from hibernation mode is difficult to accomplish in independent distributed communication such as WiMedia. The reason is that, when a WiMedia device enters hibernation mode, the BPST of the device in hibernation mode gradually falls out of synchronization with the BPST of the other devices operating in the beacon group to which that device belongs, due to differences in clock precision among the devices.

Therefore, WiMedia makes it mandatory to perform the following processing concerning wakeup from hibernation mode. A device in hibernation mode receives a beacon from another device in the frame immediately before waking up. The device must set its BPST in accordance with the latest BPST among the beacons received, and transmit a beacon in accordance with the set BPST to wake up. On the other hand, a device notified by a device of its intention to enter hibernation mode reserves a beacon slot for the device in hibernation mode, so that the device can restart sending a beacon in the beacon slot when waking up from hibernation mode.

However, multiple beacon groups can fall out of synchronization, because a beacon cannot be received from the device that entered hibernation mode in the same beacon group. For example, when device A1 in FIG. 7 enters hibernation mode, the beacon group BG1 dissolves. As a result, the beacon group BG2 constituted by the device A2 and the beacon group BG4 constituted by the device A4 no longer have to synchronize with each other and will start independent synchronization in the beacon group.

FIG. 9 shows points at which devices in beacon groups transmit beacons while the device A1 is in hibernation mode. The devices A2, A4, A6, and A8 that belonged to the beacon group BG1 before the device A1 entered hibernation mode have reserved a beacon slot for the device A1 in hibernation mode. Because the beacon slot reserved by the device A1 for the device A6 is emptied, the device A8 shifts beacon slots. The BPSTs of the devices (A2, A8, and A3) in the beacon group BG2 and the devices (A4, A5, and A6) in the beacon group BG4 fall out of synchronization because the beacon groups start synchronizing independently of one another.

Consider a case where the device A1 wakes up from hibernation mode in the state where multiple beacon groups start independent synchronization as described above. The device A1 will receive a beacon from another device (A2, A4, A6, A8) in a beacon band of the superframe immediately before waking up. However, according to WiMedia, when the time offset (the gap) between the BPSTs of two beacon groups that can receive each other's beacons exceeds a predetermined time (24 microseconds), the beacon groups should be merged into one. Therefore, if the time offset between BPSTs of the two beacon groups BG2 and BG4 has exceeded a permissible value (24 microseconds) for beacon synchronization, merging is performed when the device A1 wakes up and the beacon group BG1 is re-formed. Thus, the beacon groups cannot immediately synchronize with each other.

A method for merging the beacon group BG1 with the beacon groups of the devices that belonged to the beacon group BG1 will be described with reference to FIGS. 12A through 12C. The device A1 transmits a beacon in synchronization with one of the beacon groups BG2 and BG4 when the device A1 wakes up. It is assumed herein that the device A1 transmits a beacon in synchronization with the beacon group BG2.

In WiMedia, when the beacon groups whose beacon periods overlap each other are to be merged, the beacon group that has the later BPST shifts the beacon to the slot succeeding the beacon slot of the beacon group having the earlier BPST. The devices A4 and A6 in FIG. 12A, which have received a beacon of the device A1, wait for a random number of superframes and then transmit beacons in the beacon slots succeeding the beacon slot of the device A8, thereby avoiding collision between the beacons during merging (FIG. 12B).

The device A5 does not transmit a beacon for a while after the device A4 received the beacon of the device A1 and therefore can communicate only with the device A7 during the time period. When the device A4 starts transmitting a beacon in synchronization with the device A1, the device A5 becomes unable to transmit a beacon for a time period equivalent to a random number of superframes. The device A5 will subsequently transmit a beacon in synchronization with the device A4 in the beacon slot succeeding the beacon slot of the device A6 (FIG. 12C). The devices A4 and A6 can shift the beacon slots for which other devices have not reserved bands while the device A5 is merging (FIG. 12C).

If other synchronization relationships exist between beacon groups, the merging of one beacon group can have a ripple effect on other beacon groups. Consequently, merging between beacon groups can significantly restrict communication and reduce communication efficiency.

SUMMARY OF THE INVENTION

The present invention has been made in light of the problems. According to an exemplary embodiment of the present invention, there is provided a communication apparatus and a control method for controlling the communication apparatus capable of avoiding merging of beacon groups, even if a device wakes up from a hibernation status.

A communication apparatus which forms a beacon group to perform communication, comprising:

a determination unit adapted to determining a hibernation period on the basis of the amount of an offset in beacon period start timing among a plurality of beacon groups, the amount of the offset being caused by the communication apparatus entering a hibernation status; and a hibernation unit adapted to placing the communication apparatus in a hibernation status in accordance with the hibernation period determined by the determination unit.

Further features of the present invention will become apparent from the following description of exemplary embodiments with reference to the attached drawings.

BRIEF DESCRIPTION OF THE DRAWINGS

FIGS. 12A through 12C are diagrams illustrating a method for merging a beacon group with beacon groups of devices that have belonged to the former beacon group.

DESCRIPTION OF THE EMBODIMENTS

First Embodiment

Figure 1:
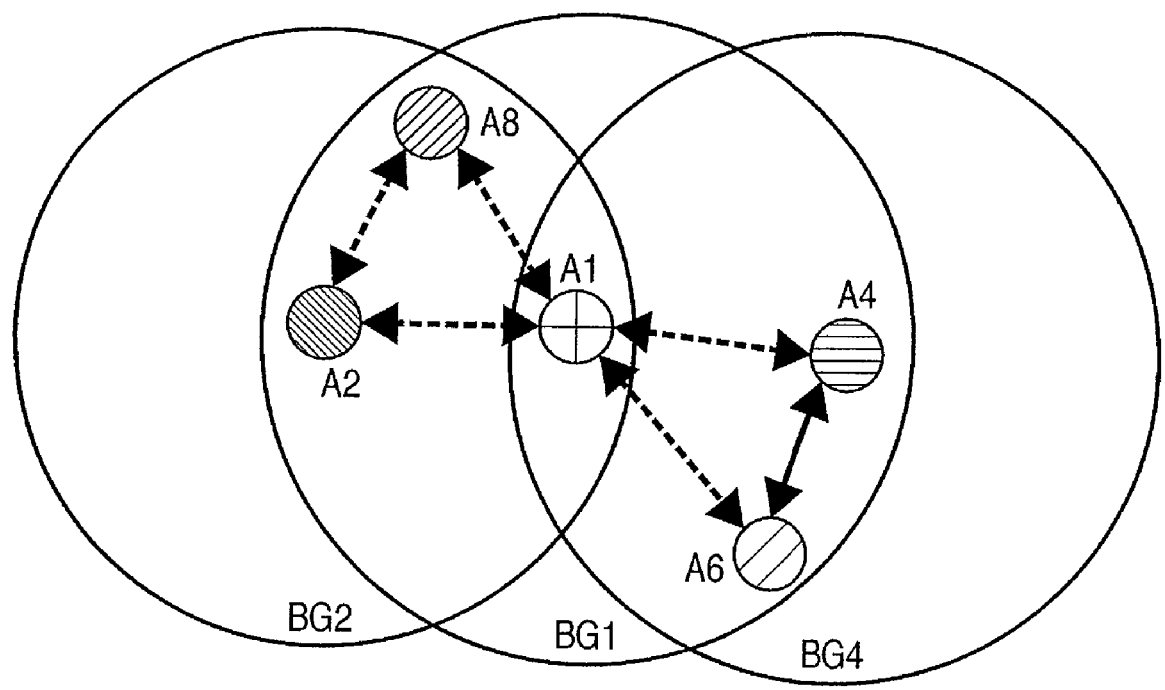
FIG. 1 is a diagram illustrating an example of formation of beacon groups by wireless communication apparatuses according to a first embodiment of the present invention.
Figure 2:
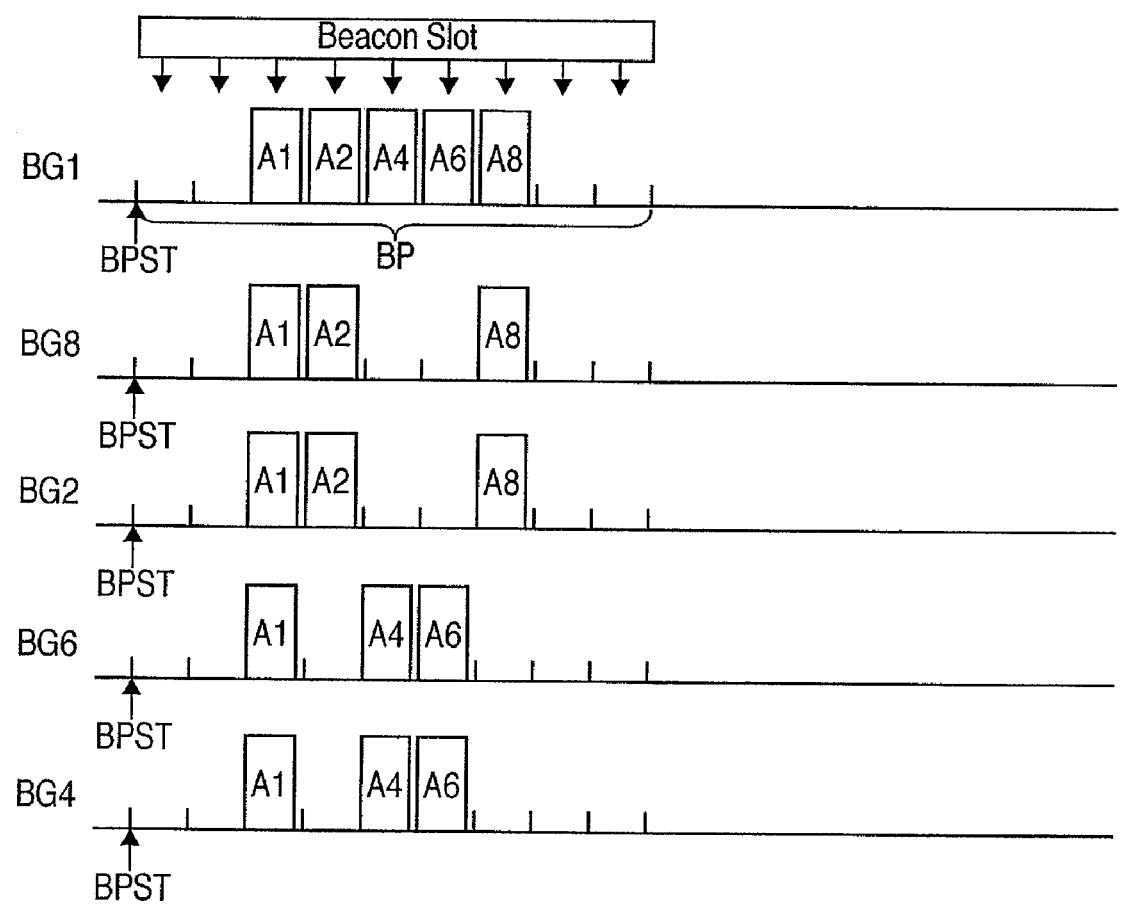
FIG. 2 is a diagram showing a state of beacon transmission in beacon groups of devices before device A1 shown in FIG. 1 enters hibernation mode.
Figure 3:
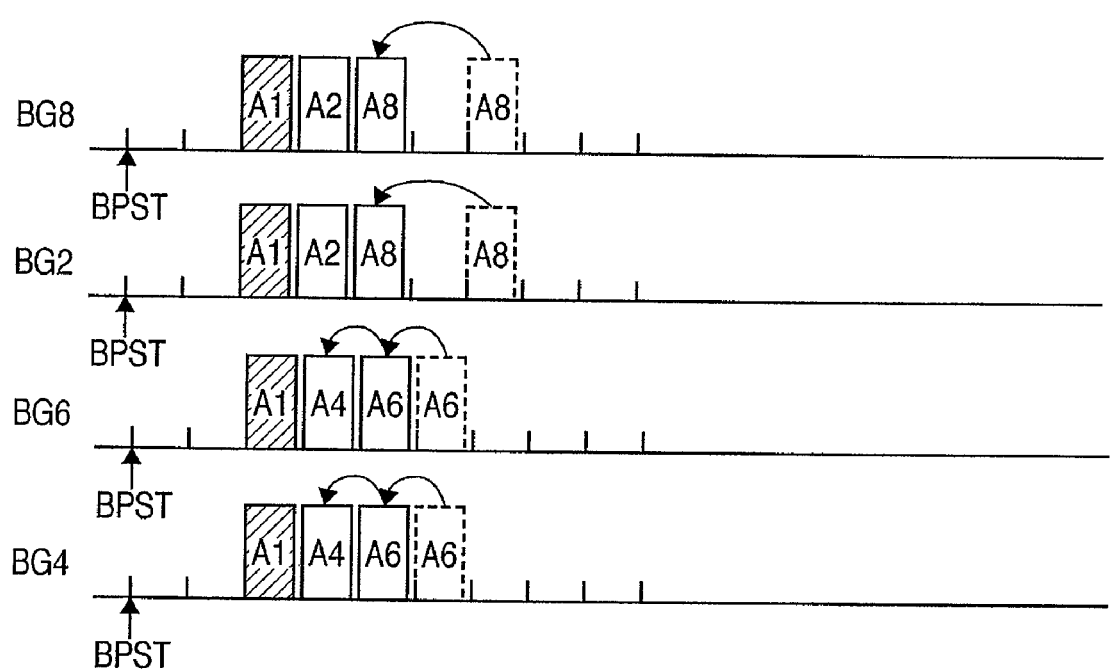
FIG. 3 is a diagram showing a state of beacon transmission in the beacon group while device A1 is in hibernation mode.
Figure 4:
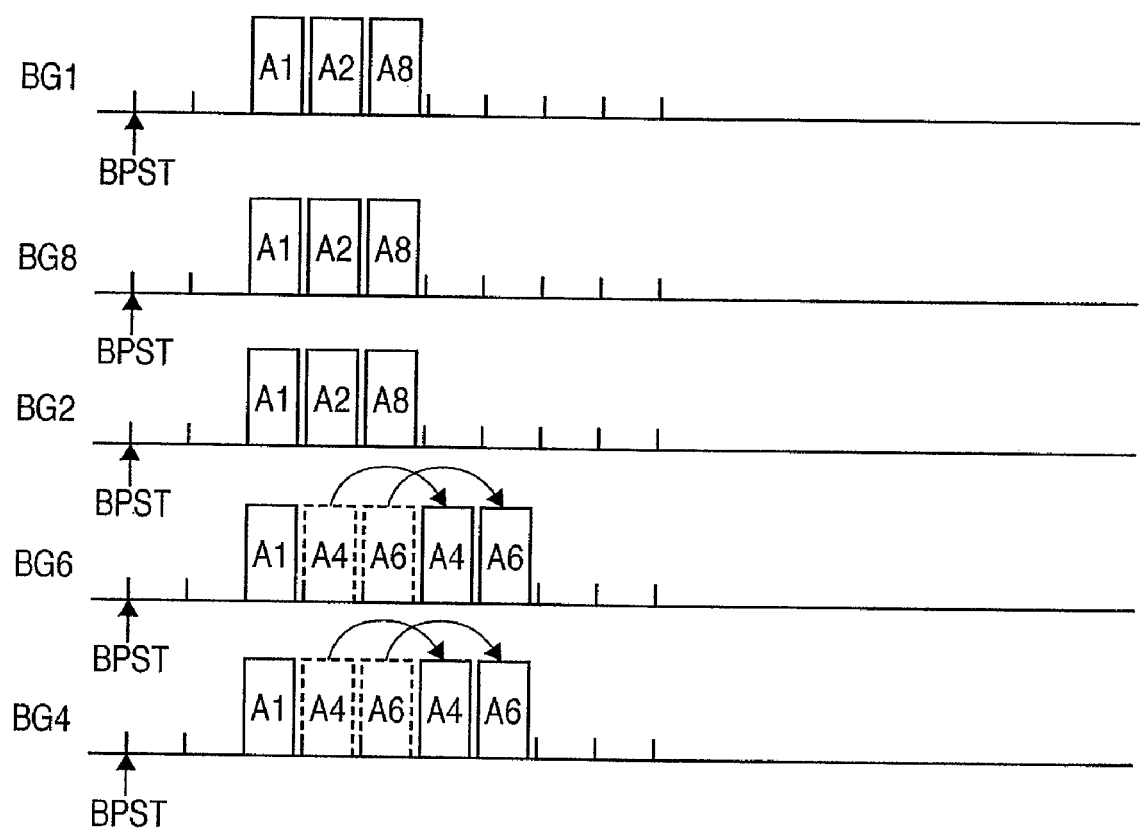
FIG. 4 is a diagram showing a state of beacon transmission of the devices in the beacon groups after device A1 wakes up.
Figure 5:
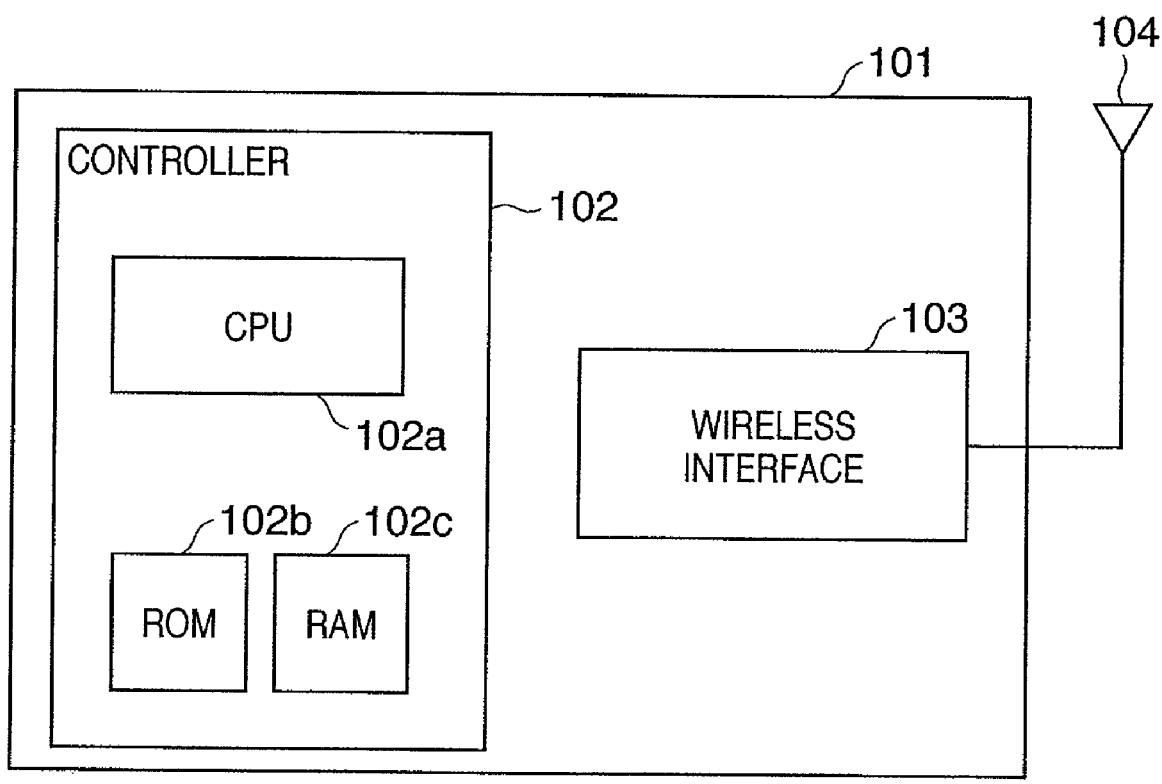
FIG. 5 is a block diagram sowing an exemplary configuration of a wireless communication apparatus according to the first embodiment.
Figure 6:
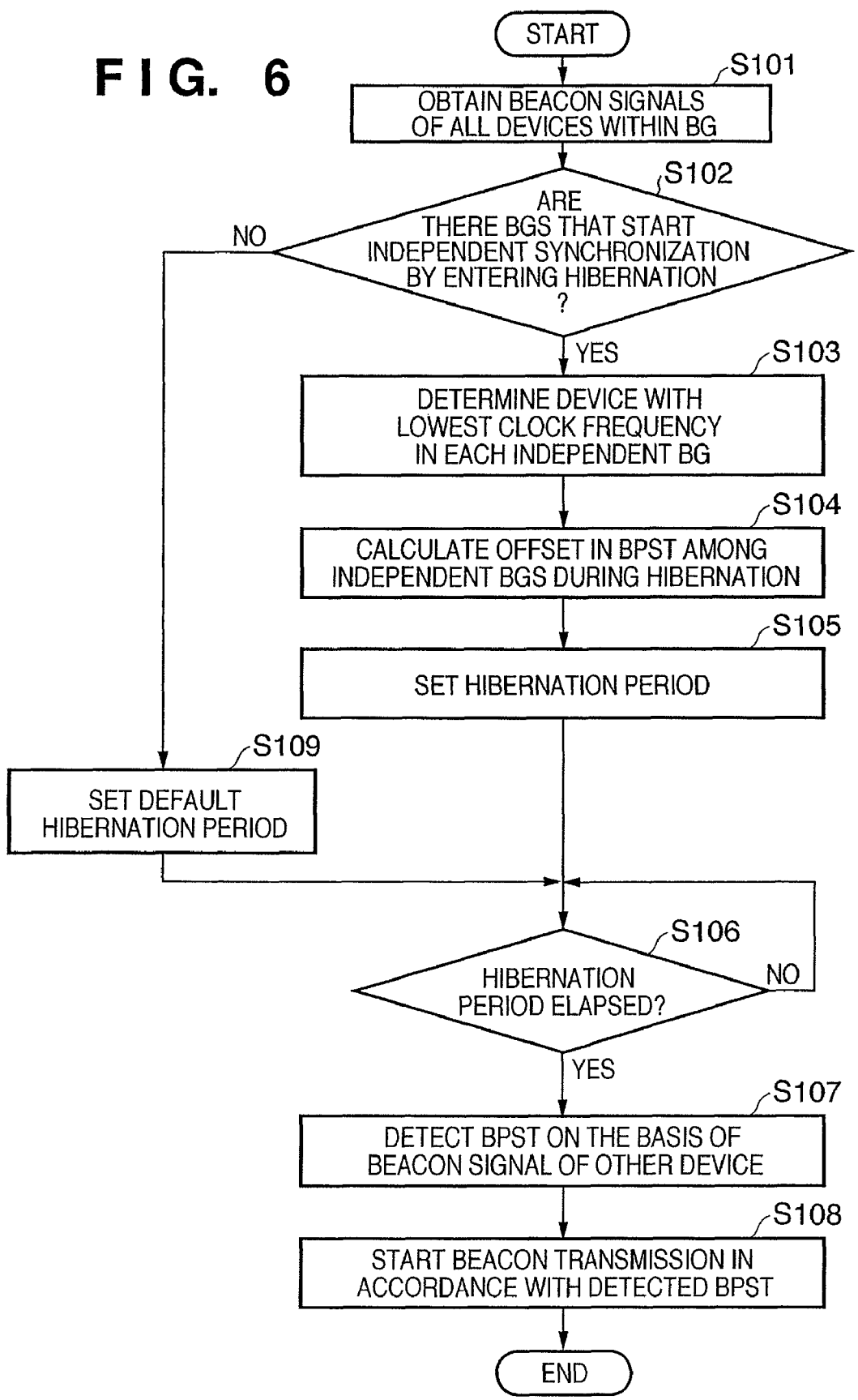
FIG. 6 a is a flowchart of operation of device A1 according to the first embodiment.

FIG. 1 is a diagram illustrating an example of formation of beacon groups of wireless communication apparatuses (devices) according to the first embodiment. FIG. 2 shows beacon transmission by devices in the beacon groups before a device A1 in FIG. 1 enters hibernation mode. FIG. 3 shows beacon transmission in the beacon groups while the device A1 is in hibernation mode. FIG. 4 illustrates beacon transmission by the devices in the beacon groups after the device A1 wakes up. FIG. 5 is a block diagram showing an exemplary configuration of a wireless communication apparatus according to the first embodiment. FIG. 6 is a flowchart of operation of the device A1.

Devices A1, A2, A4, A6, and A8 in FIG. 1 are devices performing wireless communication using independent distribution communication protocol. The independent distribution communication protocol used in examples herein is WiMedia, as defined in Standard ECMA-368. The beacon group BG1 of the device A1 is constituted by devices A1 and the devices A2, A4, A6, and A8, which are capable of communicating with the device A1. The beacon group BG2 of the device A2 is constituted by the device A2 and the devices A1 and A8, which are capable of communicating with the device A2. The beacon group BG4 of the device A4 is constituted by the device A4 and the devices A1 and A6, which are capable of communicating with the device A4. Beacon group BG6 of the device A6, not shown in FIG. 1, is constituted by the device A6 and the devices A1 and A4, which are capable of communicating with the device A6. Beacon group BG8 of the device A8 is constituted by the device A8 and the devices A1 and A2, which are capable of communicating with device A8. In the present circumstance, device A1 will enter hibernation mode.

Each of the devices shown in FIG. 1 has a wireless communication apparatus as shown in FIG. 5. For example, if a device in FIG. 1 is a printer, the printer includes a wireless communication apparatus 101 as shown in FIG. 5, and therefore includes wireless communication capability in addition to printing capability. A controller 102 in the wireless communication apparatus 101 implements various control functions relating to wireless communication, including hibernation control, which will be described hereinafter. The controller 102 has a CPU 102a, for example, and executes a control program stored in a ROM 102b to implement wireless communication control. The control program stored in the ROM 102b is a program for implementing various kinds of control relating to wireless communication, including hibernation control, which will be described hereinafter. A RAM 102c provides a work area that is used by the CPU 102a for performing various kinds of control. A wireless interface 103 wirelessly transmits a signal output from the controller 102 through an antenna 104 and converts a radio signal received through the antenna 104 into a digital signal that can be processed by the controller 102. If the device is a printer, for example, a print controller may also functions as the controller 102.

BG1 in FIGS. 2, 3, and 4 is a beacon group formed by the device A1. Similarly, BG2, BG4, BG6, and BG8 are beacon groups formed by the device A2, the device A4, the device A6, and the device A8, respectively. A1, A2, ... in each beacon group are beacon slots in which devices A1, A2, ... transmit a beacon.

In the BG1 in FIG. 2, the devices A1, A2, A4, A6, and A8, which belong to the BG1, transmit beacons in their respective beacon slots. Similarly, in the BG8, the devices A1, A2, and A8, which belong to the BG8, transmit a beacon. The device A8 can identify a device that belongs to the BG1 from BPOIE in a beacon transmitted by the device A1. The device A8 synchronizes with each beacon group formed by each device in the beacon group formed by device A8, that is, an extended beacon group (EBG). The other devices also operate in synchronization with EBGs.

When the device A1 goes from the state in FIG. 2 into hibernation mode, the BG1 disappears and the state shown in FIG. 3 is entered. As shown in FIG. 3, a beacon slot of the device A1 that entered hibernation mode is reserved in BG2, BG4, BG6, and BG8. Since BG1 has disappeared, BG8 need only synchronize with BG2. Similarly, BG2 need only synchronize with BG8, BG4 need only synchronize with BG6, and BG6 need only synchronize with BG4.

Consequently, BG2 and BG8 no longer need reserve beacon slots for the devices A4 and A6. Therefore, the beacon slot of the device A8 is shifted to the position immediately after the beacon slot of the device A2. BG4 and BG6 also no longer need to reserve a beacon slot for the device A2. Therefore, the beacon slots of the devices A4 and A6 are shifted to the position immediately after the beacon slot of the device A1.

FIG. 4 shows beacon transmission in the beacon groups when the device A1 wakes up from hibernation mode in FIG. 3. In FIG. 4, the device A1 intercepts the beacons of the devices A2, A4, A6, and A8 in the superframe immediately preceding the wakeup of the device A1. Because devices the A4, A6, and A8 shifted the beacon slots while the device A1 was in hibernation mode, the beacons of the devices A2 and A4 collide with each other and the beacons of the devices A6 and A8 collide with each other. Therefore, only one of the beacons of the colliding devices can be received in the superframe immediately preceding the wakeup of the device A1. However, even through the beacons of the devices which are colliding with each other are present, it is likely that information contained in a beacon can be properly analyzed because of robustness for interference signal of the physical format of WiMedia. It is assumed herein that the device A1 can receive the beacons of the devices A2 and A8. Because the device A1 can receive the beacons of the devices A2 and A8, the device A1 includes the devices A2 and A8 in BG1 as members, and transmits a beacon containing a BPOIE including information indicating the positions of the beacons of the devices A1, A2, and A8, as shown in FIG. 4. When the device A1 wakes up and starts transmitting the beacons in the beacon slots reserved for the device A1 by other devices, the devices A2, A4, A6, and A8 receive the beacons of the device A1. Because the device A1 has received the beacons of the devices A2 and A8 before the wakeup, the beacon slot next to the beacon slot of the device A1 is reserved for the device A2, and the beacon slot next to the beacon slot of the device A2 is reserved for the device A8. When the devices A4 and A6 receive the beacon from the device A1, the devices A4 and A6 can determine that the beacon slots used for transmitting beacons are being used by another device. Accordingly, the device A4 moves the beacon to the beacon slot next to the beacon slot of the device A8 and the device A6 moves the beacon to the beacon slot next to the beacon slot of the device A4. Consequently, collision between the beacons in the device A1 is avoided.

The device A1 according to the embodiment calculates a time offset in BPST between beacon groups BG2 and BG4 in BPST that occurred during the period of the device A1 by using a method, to be described hereinafter, and wakes up from hibernation mode within a time limit in which the BPSTs of the beacon groups BG2 and BG4 can be synchronized with each other. Thus, the devices detect each other's beacons in the superframe immediately after the wakeup of the device A1 as shown in FIG. 4, and the devices become able to start communication in bands reserved in the beacons. That is, the communication apparatus according to the first embodiment prevents a wait for a random number of superframes required for merging and a shift of beacon slots that would otherwise caused by interruption of beacon transmission during the wait. Accordingly, quick synchronization can be achieved, and reduction in communication efficiency can be prevented.

A method for calculating a time offset in BPST and a method for setting a hibernation period of a device will be described with reference to the flowchart in FIG. 6. The device A1 detects the beacons from all devices constituting BG1 (S101). Then, the device A1 identifies beforehand, on the basis of BPOIE contained in a beacon from each device in BG1, a device from which each device can receive a beacon. When entering hibernation mode, the device A1 determines which device's beacon group will start independent synchronization when the device A1 enters hibernation mode (S102). If the device A1 determines that no independent beacon group is formed when the device A1 enters hibernation mode (S102), the device A1 sets a predetermined hibernation period and enters hibernation mode (S109). On the other hand, if the device A1 determines that any of the beacon groups will start independent synchronization when the device A1 enters hibernation mode, the device A1 identifies the device that has the lowest clock frequency in each of the beacon groups (S103). Then, the device A1 calculates the time offset in BPST between independent beacon groups on the basis of the difference in frequency between the devices having the lowest clock frequencies in the independent beacon groups (S104) and sets hibernation period such that the offset does not exceed a permissible value (24 microseconds) for synchronization (S105).

In a configuration shown in FIG. 1, the device A1 recognizes that beacon groups BG2 and BG8 consisting of devices A2 and A8 and beacon groups BG4 and BG6 consisting of devices A4 and A6 will start independent synchronization. The beacon period start time BPST of each of the beacon groups BG2, BG4, BG6, and BG8 is set to the BPST of the slowest device in each group.

If the device A1 can detect beacons of all devices detected by each device in BG1 before the device A1 enters hibernation mode as shown in FIG. 1, the device A1 can calculate the clock rate of each device by receiving a beacon or other communication signal from the device.

When the device A1 enters hibernation mode in FIG. 1, the following situation can result. The BPST of one of devices A2 and A8 belonging to BG2 that has a lower clock frequency lags behind the BPST of the other device having a higher clock frequency. Then the device having the higher clock frequency starts synchronizing with the device having the lower clock frequency. Similarly, the BPST of one of devices A4 and A6 in BG4 that has a lower clock frequency lags behind the BPST of the other device having the higher clock frequency. Then the device having the higher clock frequency starts synchronizing with the device having the lower clock frequency. Therefore, the device A1 determines the device that has the lowest clock frequency in each beacon group that starts independent synchronization (S103).

The device A1 calculates a time offset in BPST of the beacon groups that occurs during hibernation of the device A1 from the difference in clock frequency between the device that has a lower clock frequency in the devices A2 and A8 and the device that has a lower clock frequency in the devices A4 and A6 (S104). The device A1 determines from the calculated offset a hibernation period such that the offset is within a range in which the beacon groups are regarded as being in synchronization with each other when the device A1 woke up (S105). That is, the device A1 determines a hibernation period such that the offset does not exceed a permissible value (24 microseconds) for synchronization when the device A1 woke up.

The device A1 then enters and remains in hibernation mode for the determined hibernation period. After the hibernation period has elapsed (S106), the device A1 detects beacons of other devices during one superframe period. The device A1 detects the BPST of the neighboring beacon groups by detecting beacons (S107), adjusts the BPST of the beacon group BG1 formed by the device A1, as required, in accordance with the detected BPST, and wakes up by starting transmitting beacons (S108). Operation performed by the device A1 when waking up has been described with respect to FIGS. 3 and 4, and therefore further description thereof will be omitted.

Thus, the beacon groups that were in independent synchronization is restored to one beacon group without requiring complicated merging and therefore reduction in data rate can be prevented.

Second Embodiment

Figure 7:
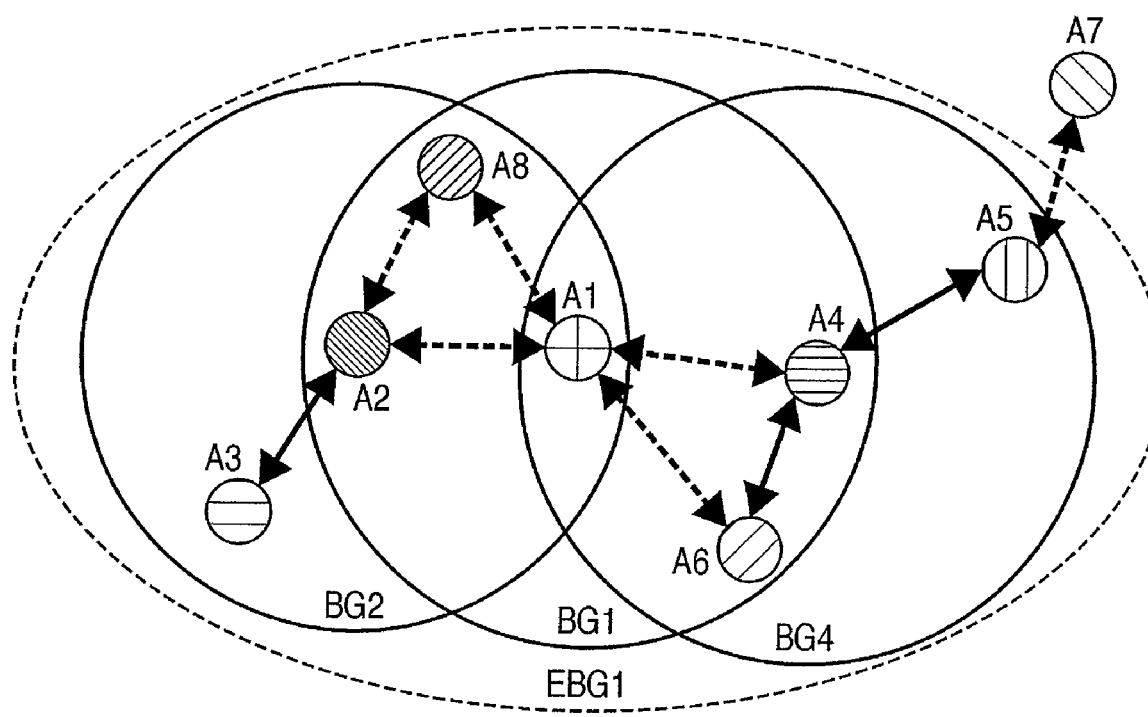
FIG. 7 is a diagram showing an exemplary arrangement of beacon groups, each consisting of a WiMedia device and it neighboring other WiMedia devices.
Figure 8:
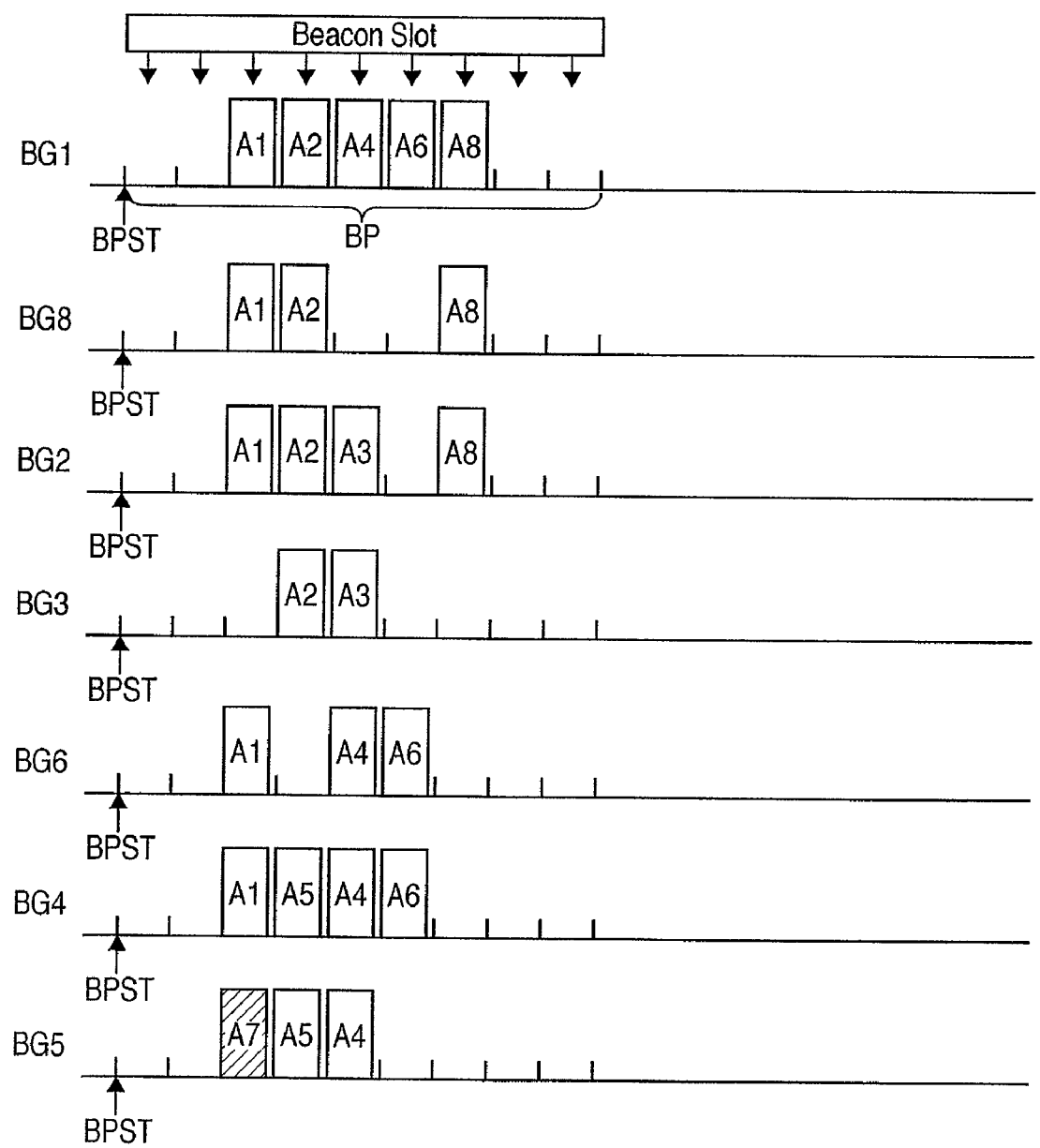
FIG. 8 is a diagram showing a state of beacon transmission of devices in the beacon groups.
Figure 9:
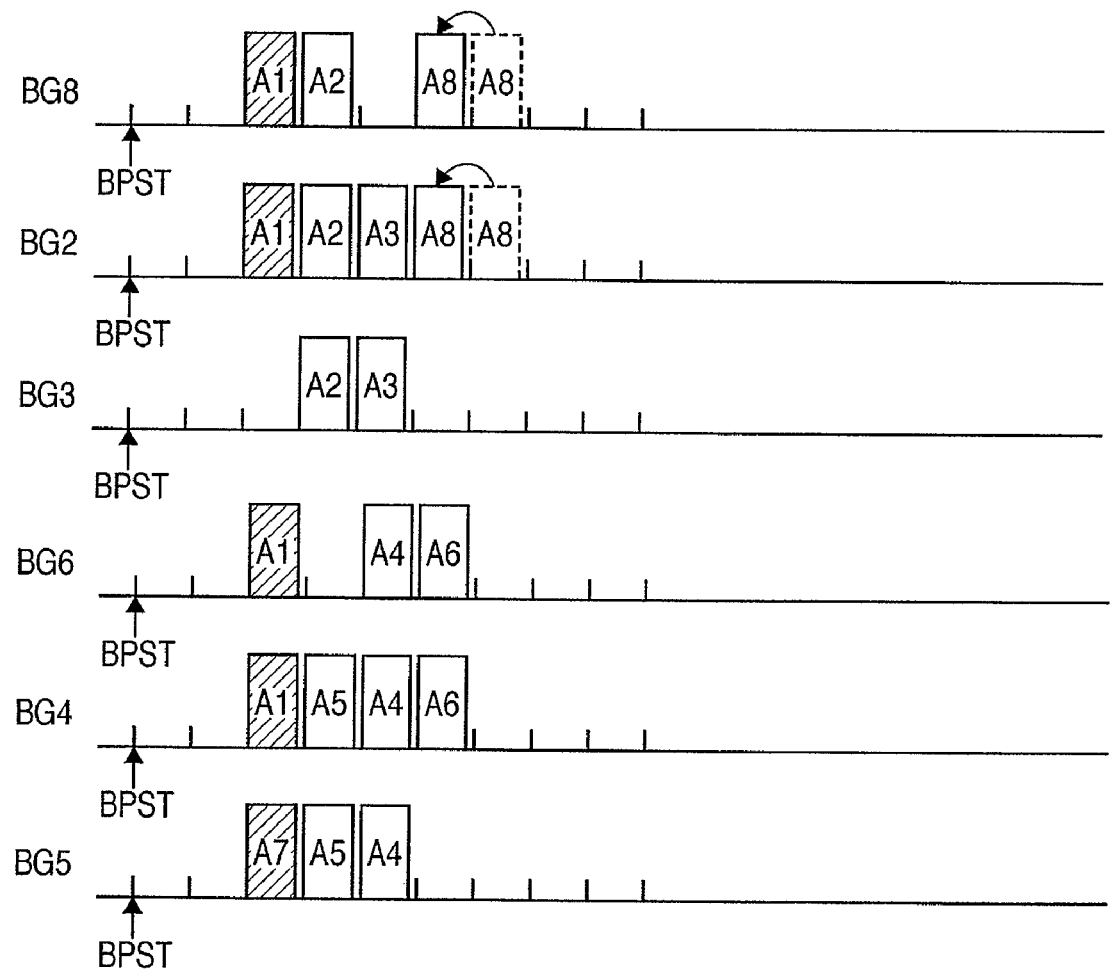
FIG. 9 is a diagram showing beacon transmission positions of the devices in the beacon groups while device A1 is in hibernation mode.
Figure 10:
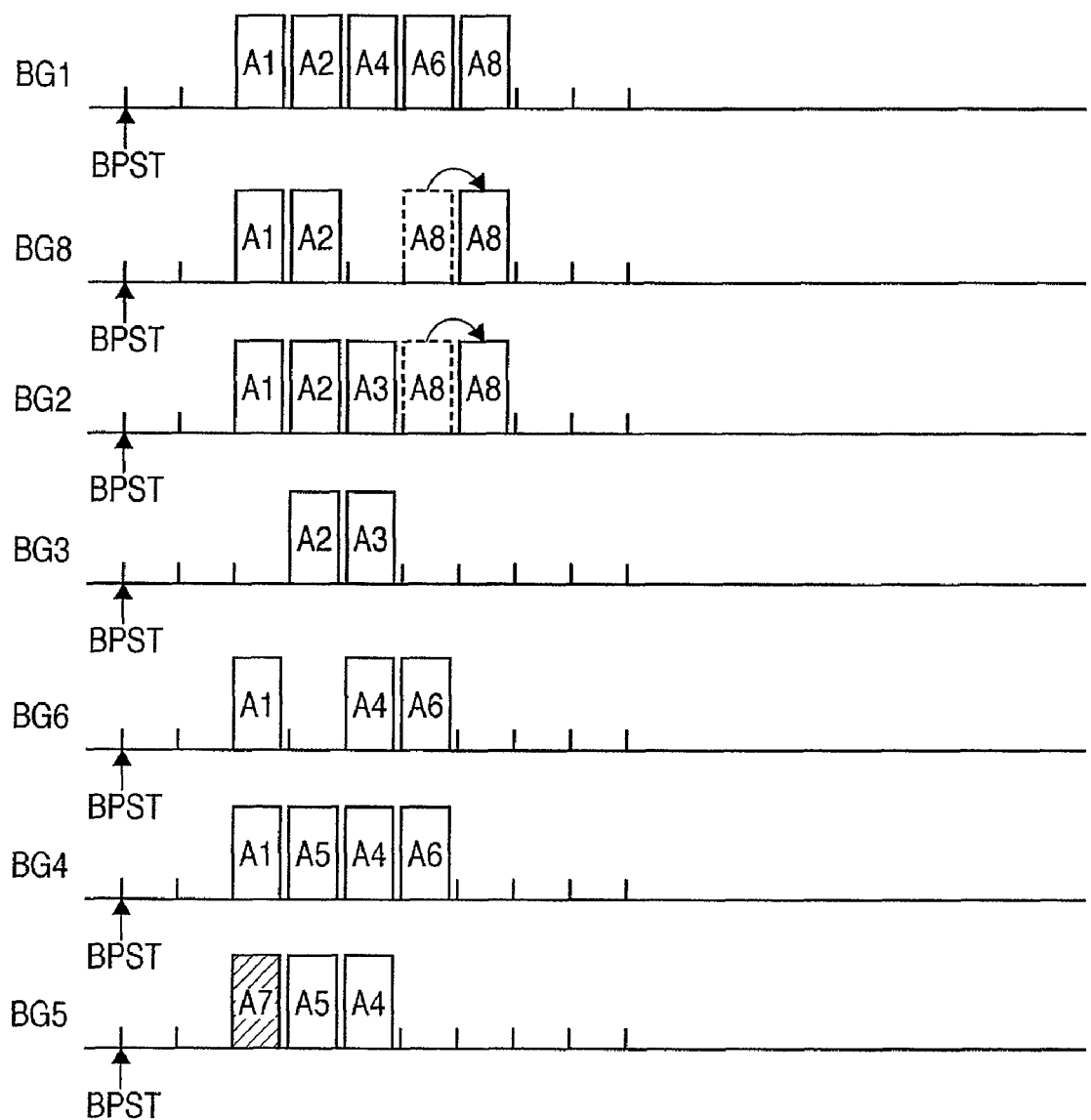
FIG. 10 is a diagram illustrating a state of beacon transmission of the devices in the beacon groups after device A1 wakes up according to a second embodiment of the present invention.
Figure 11A:
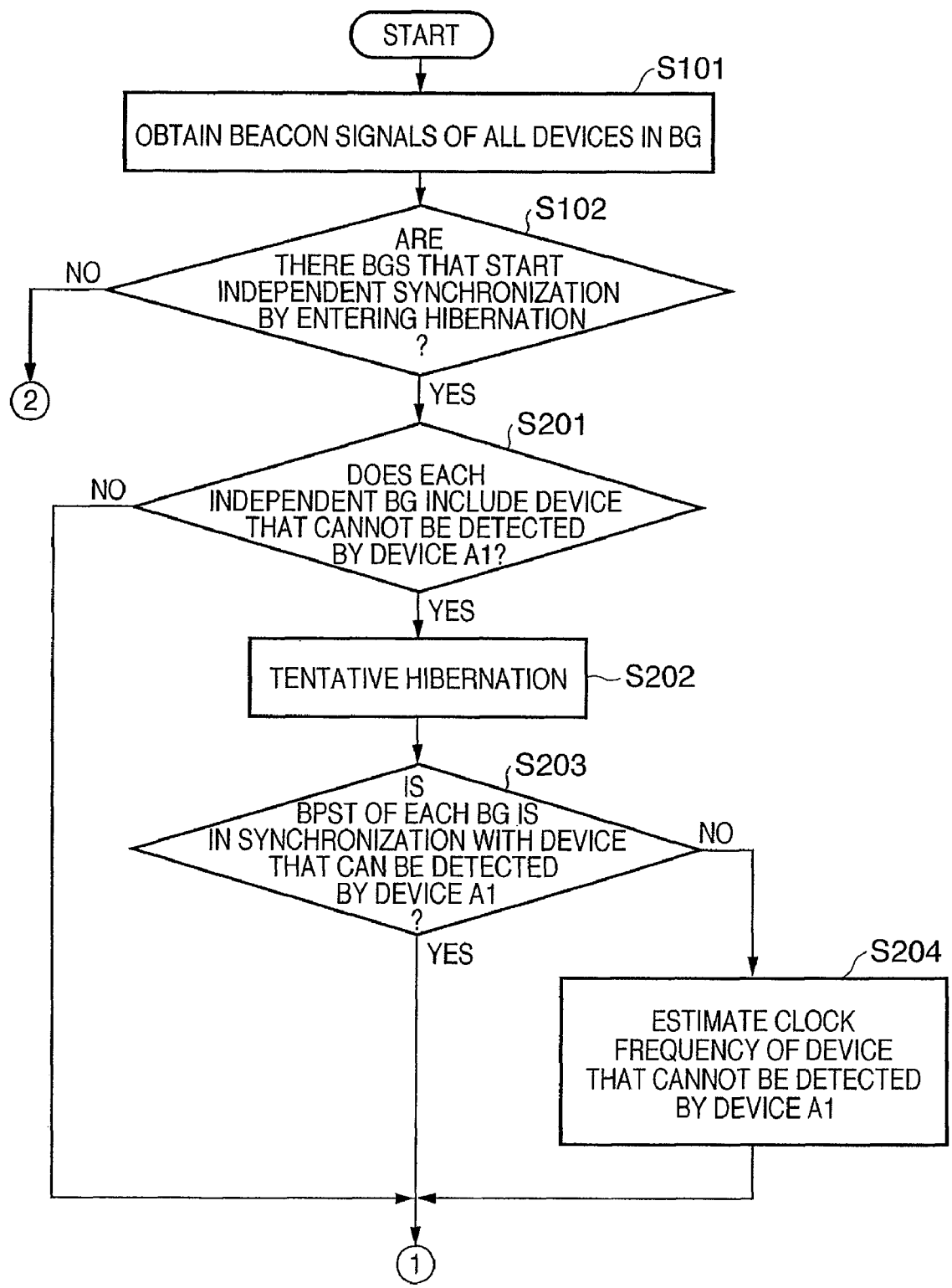
FIGS. 11A and 11B are flowcharts of operation of device A1 according to the second embodiment.
Figure 11B:
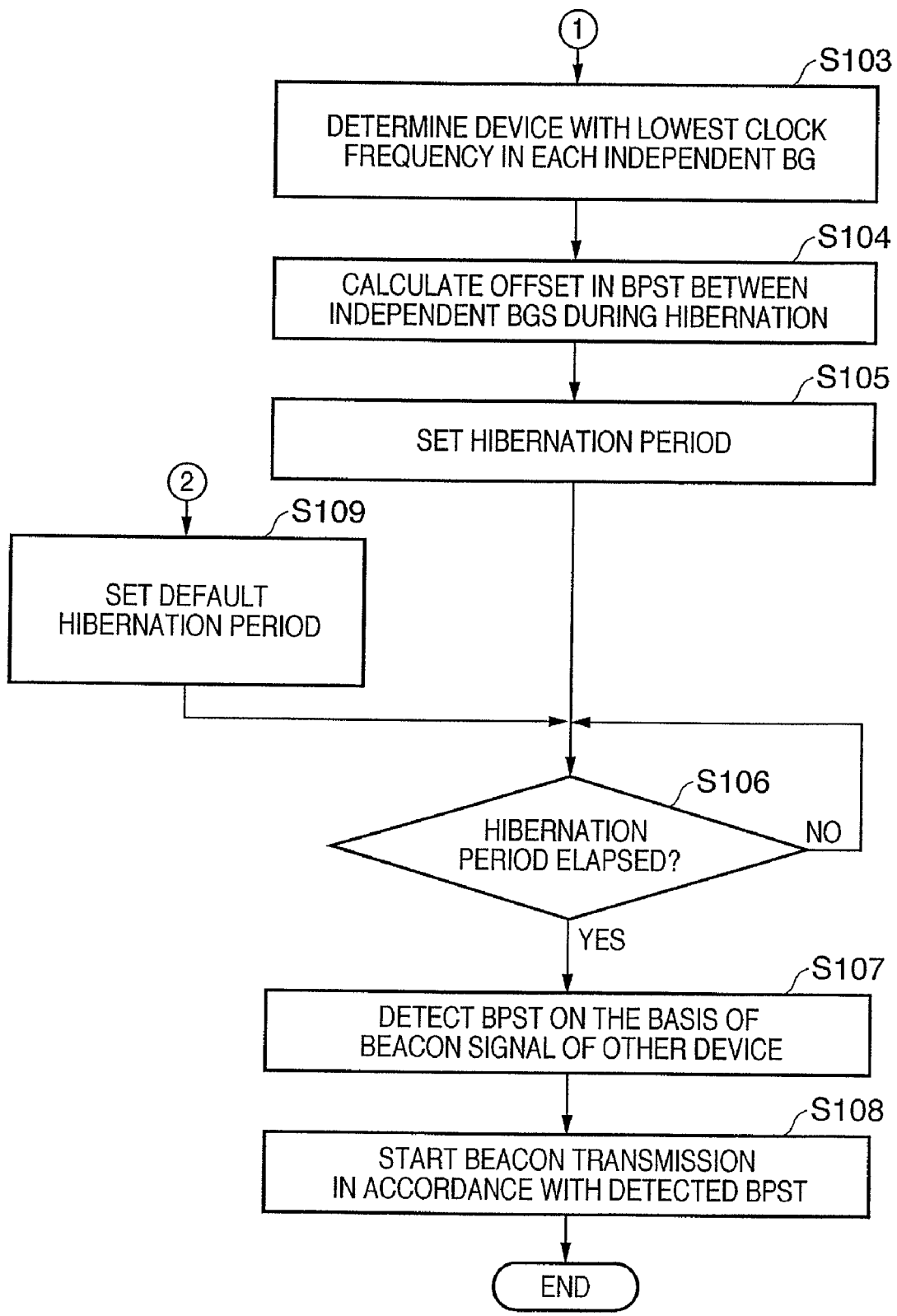
Figure 12B:
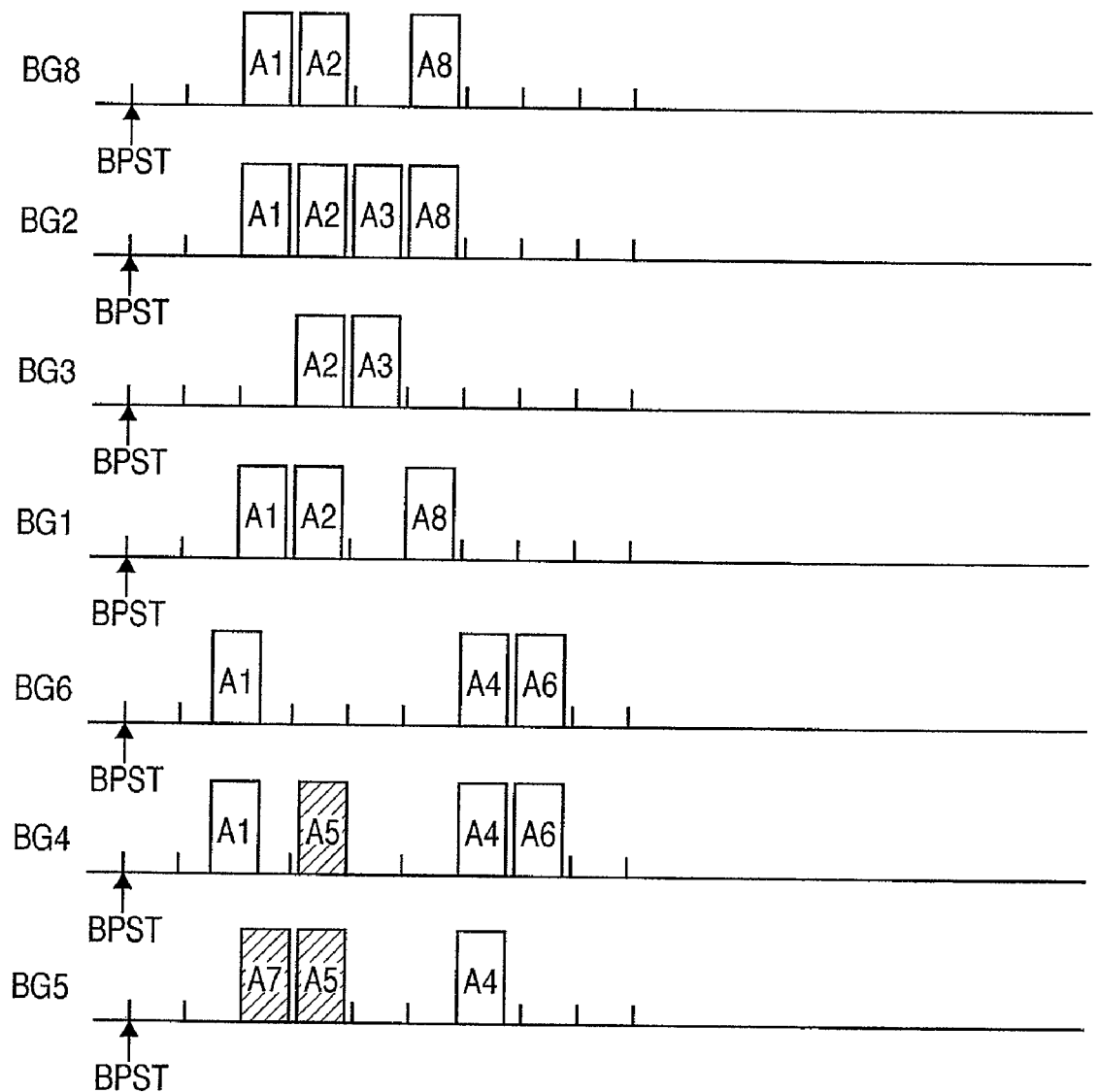
Figure 12C:
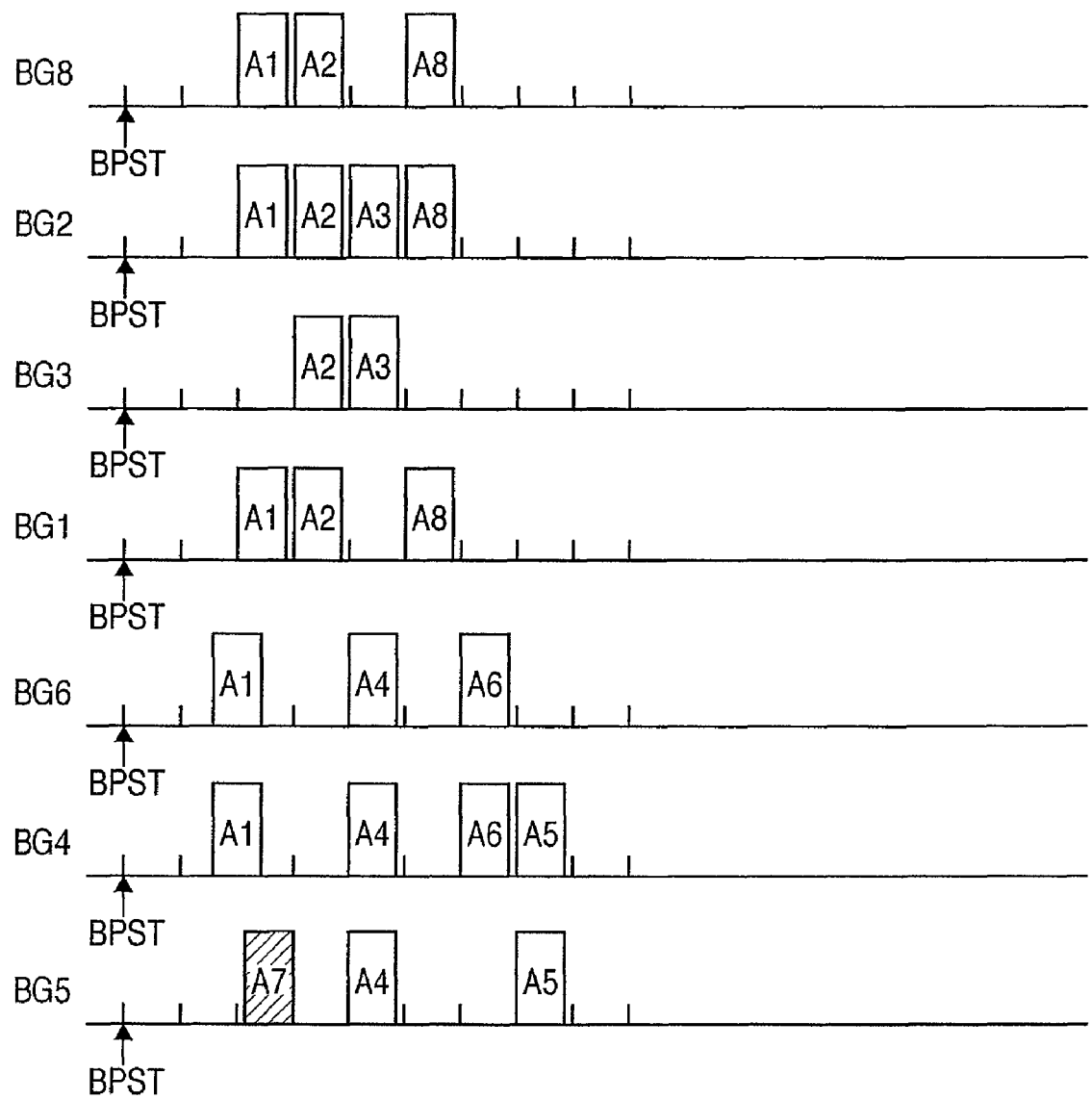

FIG. 7 is a diagram illustrating an example of formation of beacon groups according to a second embodiment. FIGS. 7 to 9 used in the description of related art will be used in the description of the second embodiment for simplicity. FIG. 8 shows beacon transmission of devices in beacon groups before the device A1 in FIG. 7 enters hibernation mode. FIG. 9 shows beacon transmission in the beacon groups while the device A1 is in hibernation mode. FIG. 10 is a diagram illustrating beacon transmission of the devices in the beacon group after the device A1 woke up. FIGS. 11A and 11B are flowcharts of operation of the device A1. Like the devices in the first embodiment, each of the devices in the second embodiment has a wireless communication apparatus shown in FIG. 5. However, a control program stored in the ROM 102b differs from that of the first embodiment in that the control program of the second embodiment operates as described below.

The devices A1 to A8 in FIG. 7 are devices that are performing wireless communication using an independent distributed communication protocol. The beacon group BG1 of the device A1 is constituted by the device A1 and the devices A2, A4, A6, and A8 capable of communicating with the device A1. The beacon group BG2 of the device A2 is constituted by the device A2 and the devices A1, A8, and A3 capable of communicating with the device A2. The beacon group BG4 of the device A4 is constituted by the device A4 and the devices A1, A5, and A6 capable of communication with the device A4. The beacon group BG1 of the device A1 and beacon groups (BG2 and BG4 in FIG. 7) formed by the devices (A2, A4, A6, and A8) in the beacon group of the device A1 form an extended beacon group EBG1. The device A1 is a device that will enter hibernation mode.

If devices are arranged as shown in FIG. 7, the device A1 cannot receive beacons from distant devices such as the devices A3 and A5. If the clock frequency of the device A3 is lower than that of the device A2 or the clock frequency of the device A5 is lower than those of the devices A4 and A6, the device A1 cannot predict offsets in BPST of the beacon groups BG2 and BG4 that occurs while the device A1 is in hibernation. This is because the BPST of beacon groups BG2 and BG4 depends on the clock frequencies of the devices A3 and A5 from which beacons cannot be received by the device A1. Thus, when a device entering in hibernation mode constitutes an extended beacon group EBG1, a hibernation period can be set such that an offset between BPSTs can exceed a permissible value for beacon synchronization even if the technique of the first embodiment is used.

In the second embodiment, even in the case described above, a configuration will be described that enables a difference in BPST between separated beacon groups to be properly predicted and a proper hibernation period to be set.

When BPOIE in a beacon from another device indicates a device from which the device A1 cannot receive beacons in the beacon group BG1 before the device A1 enters hibernation, the device A1 can identify that an extended beacon group has been formed.

If an extended beacon group has been formed, the device A1 calculates an offset in BPST as follows. First, the device A1 is placed in hibernation for a given time period. During the hibernation, an offset for a given hibernation period is calculated from the amounts of changes in BPST of beacon groups BG2 and BG4 that maintain independent synchronization during the hibernation. The given hibernation period is herein referred to as tentative hibernation. Based on the calculated offset, the period of the subsequent hibernation mode is calculated such that the offset in BPST is within a permissible limit for beacon synchronization.

As has been described, the device A1 is placed in hibernation for a given time period in order to determine the amounts of changes in BPST of multiple beacon groups that start individual synchronization by the device A1 entering hibernation. Then, based on information collected during the tentative hibernation, the subsequent hibernation period is set. For example, the following steps (1) to (3) are performed.

(1) A short period is set such that BPSTs of multiple BGs do not exceed a permissible value for beacon synchronization even if there are significant variations in clock precision between devices.

(2) From the BPST of a beacon group of a device that is transmitting in the period set in (1) a beacon in which BPIOE contains a device that cannot be detected by the device A1, a device which the device of the beacon group has brought its BPST into synchronization is detected. If no other device participates and the beacon group is in synchronization with a device detected by the device A1, an offset of BPST of the device is calculated in the subsequent hibernation. If it is calculated that the beacon group is in synchronization with a device that has not been detected by the device A1, the clock frequency of the device that has not been detected is calculated in the hibernation period set in step (1). Then, an offset from the BPST of another beacon group that maintains independent synchronization is calculated in the subsequent hibernation and a setting is made such that the BPST does not exceed a permissible value for beacon synchronization during the subsequent hibernation period.

(3) If BPOIE in a beacon of a device in a beacon group that is in independent synchronization does not contain a device that the device A1 cannot detect, the device A1 operate as follows. The device A1 calculates an offset in BPST of the device that has the lowest frequency in the beacon group that occurs during hibernation of the device A1.

It should be noted that if the device A1 has already received a beacon from the device that has the lowest clock frequency in each BG in (2), hibernation period does not need to be re-set.

The process performed by the device A1 in the second embodiment described above will be further described with reference to a flowchart in FIGS. 11A and 11B.

The device A1 detects beacons from all devices constituting BG1 (S101). Then, the device A1 identifies beforehand, from BPOIE in beacons of the devices in BG1, devices from which each of the devices can receive beacons. When the device A1 enters hibernation mode, the device A1 determines, on the basis of the result of identification, which device's beacon group starts independent synchronization (S102). If the device A1 determines that no independent beacon group will be formed when the device A1 enters hibernation mode (S102), the device A1 sets a predetermined hibernation period and enters hibernation mode (S109). On the other hand, if the device A1 determines that a beacon group that starts independent synchronization when the device A1 enters hibernation mode will be formed, the device A1 determines whether there is a device that is transmitting a beacon including BPOIE containing a device whose beacon cannot be detected by the device A1. For example, the device A1 in FIG. 7 cannot receive a beacon signal from the device A5 even though the device A5 is contained in BPOIE in a beacon signal from the device A4. As such, the device A1 determines whether there is a device that belongs to a beacon group that includes a device whose radio signal does not directly reach the device A1. With this determination, the device A1 determines whether a beacon group that starts independent synchronization when the device A1 enters hibernation mode includes a device whose beacon the device A1 cannot detect (S201).

If there is not a device that the device A1 cannot detect in any of the beacon groups, the process branches to S103 as with the process in FIG. 6 and the process described with respect to the first embodiment is performed.

On the other hand, any of the devices in a beacon group cannot be detected by the device A1, the device A1 enters hibernation (tentative hibernation) for a given hibernation period describe above (S202). When the device A1 wakes up from the hibernation, the device A1 receives beacon signals from devices (for example the devices A2 and A4) in separated beacon groups. The device A1 detects the BPST of each beacon group and detects which device's BPST of each beacon group is in synchronization with. Then the device A1 determines whether each beacon group is in synchronization with the device which has been detected by the device A1 (S203) If the beacon group is in synchronization with the device detected by the device A1, the device A1 determines that the device has the lowest frequency in the beacon group and the process branches to step S103, where the device A1 performs the process described with respect to the first embodiment. On the other hand, if it is determined that any of the beacon groups is in synchronization with a device that cannot be detected by the device A1, the device A1 operates as follows. The device A1 calculates the clock frequency of the device that cannot be detected by the device A1 from an offset of the BPST of the beacon group that occurred during the given period of hibernation described above (S204). Then, the device A1 adopts the clock frequency of the device as the frequency of the device that has the lowest frequency in the beacon group (S103). After the device that has the lowest frequency in each beacon group is determined (S103), the subsequent operation is the same as that in the first embodiment and therefore description of which will be omitted.

While tentative hibernation is performed every time for detecting an offset of BPST before starting hibernation in the flowchart of FIGS. 11A and 11B, the present invention is not so limited. For example, tentative hibernation may be entered in order to set a hibernation period only when hibernation is started at the first time, and tentative hibernation may be omitted and the preset hibernation period may be used when hibernation is subsequently entered. Alternatively, tentative hibernation may be entered to perform detection of an offset in BPST described above after a predetermined number of hibernations. Alternatively, after hibernation is entered a predetermined number of times, an offset of BPST caused by the hibernation may be detected to update the hibernation period period.

Furthermore, in the second embodiment, based on offsets of BPST caused by the previous hibernation period and the current hibernation period, the next hibernation period may be determined. With this, the hibernation period is always updated to set a hibernation period appropriate for each hibernation operation.

The maximum hibernation period of a device is specified in the device's specifications. If the device remains in hibernation for a period longer than the specified maximum hibernation period, the device must disconnect the association. Therefore, even if an offset of BPST of multiple BGs that start independent synchronization due to hibernation of the device A1, for example, is small and a long hibernation period can be set for the device A1, the hibernation period is preferably set to a value that does not exceed the specified value of hibernation period period.

As has been described, according to the embodiments described above, the period of hibernation mode for reducing power consumption is set such that an offset in BPST between beacon groups that start independent synchronization does not exceed a permissible value for beacon synchronization. That is, the period of hibernation mode for reducing power consumption is set in accordance with the clock precisions of devices so that BPST offsets will be determined not to exceed a predetermined value. Therefore, time is not taken to merge BGs when a device wakes up from hibernation and therefore reduction in the data rate during merging can be prevented. Furthermore, the workload for merging is eliminated and therefore power consumption can be further reduced.

According to the present invention, even though beacon groups start individual synchronization by a device entering hibernation, merging of beacon groups is not required when the device wakes up. Thus, decrease in communication efficiency due to merging of beacon groups is prevented.

Other Embodiments

Incidentally, the present invention can also be achieved by a configuration in which a software program that implements the functions of the embodiment described above is supplied to a system or apparatus either directly or remotely and a computer in the system or apparatus reads out and executes the supplied program code. In that case, the supplied program corresponds to the flowcharts illustrated in the embodiment.

Thus, the program code itself installed on the computer to implement functions and processes of the present invention on the computer also implements the present invention. That is, the present invention also includes the computer program which implements the functions and processes of the present invention.

In that case, the program code may take any form including object code, programs executed by an interpreter, and script data supplied to an OS as long as it has program functions.

Recording media available for use to supply programs include, for example, floppy (registered trademark) disks, hard disks, optical disks, magneto-optical disks, MO, CD-ROM, CD-R, CD-RW, magnetic tape, non-volatile memory cards, ROM, and DVD (DVD-ROM and DVD-R).

The program can also be supplied via an Internet homepage. In that case, the user is supposed to connect to an Internet homepage using a browser on a client computer and download the computer program of the present invention onto a recording medium such as a hard disk. The program may be downloaded as a compressed self-installing file. Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiment may be implemented not only by the program read out and executed by the computer, but also in conjunction with an OS or the like running on the computer. In that case, the functions of the above embodiment are implemented by part or all of the actual processing executed by the OS or the like in accordance with instructions from the program.

Furthermore, part or all of the functions of the above embodiment may also be implemented by part or all of the actual processing executed by a CPU or the like contained in a function expansion board inserted into the computer or a function expansion unit connected to the computer if the processing is performed in accordance with instructions from the program that has been read out of the storage medium and written into memory on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-238169 filed Sep. 1, 2006, which is hereby incorporated by reference herein in its entirety.

What is claimed is:

1. A communication apparatus which forms a beacon group to perform communication, comprising:
   an acquisition unit constructed to acquire an offset amount between beacon periods of a first beacon group and a second beacon group, wherein the first and the second beacon groups are generated due to the communication apparatus entering a hibernation status, wherein the first beacon group is generated by a first device and the second beacon group is generated by a second device, and wherein the first and the second beacon groups are independent from each other;
   a determination unit constructed to determine a hibernation period such that an offset amount between beacon periods of the first and the second beacon groups does not exceed a predetermined amount during execution of hibernation on a basis of the acquired offset amount acquired by the acquisition unit; and
   a hibernation unit constructed to place the communication apparatus in the hibernation status in accordance with the hibernation period determined by the determination unit.

2. The communication apparatus according to claim 1, wherein the acquisition unit acquires, as the acquired offset amount, an offset in beacon period start timing between the first and the second beacon groups and wherein the determination unit calculates a relationship between the acquired offset amount and an elapsed time of the hibernation status to determine the hibernation period.

3. The communication apparatus according to claim 1, further comprising:
   a discrimination unit constructed to discriminate a clock frequency of each of devices on a basis of a beacon signal received from each device belonging to the beacon group of the communication apparatus; wherein
   the acquisition unit calculates the acquired offset amount per a predetermined time period on a basis of the clock frequency of each of the devices.

4. The communication apparatus according to claim 3, wherein the acquisition unit calculates beacon period start timing of each of the first and the second beacon groups on a basis of a clock frequency of a device that has a lowest clock frequency in each of the first and the second beacon groups and calculates the acquired offset amount for the predetermined time period on a basis of the calculated beacon period start timing of each of the first and the second beacon groups.

5. The communication apparatus according to claim 1, wherein the acquisition unit actually places the communication apparatus in the hibernation status for a predetermined period and detects, as the required offset amount, an amount of an offset in beacon period start timing between the first and the second beacon groups among the plurality of beacon groups caused by the hibernation.

6. The communication apparatus according to claim 1, wherein the determination unit determines the hibernation period of a next hibernation on a basis of the acquired offset amount acquired by the acquisition unit during execution of hibernation by the hibernation unit.

7. The communication apparatus according to claim 1, further comprising:
   a decision unit constructed to decide whether there are the first and the second beacon groups which are made independent of each other by the communication apparatus entering the hibernation status
   wherein the determination unit determines the hibernation period if the decision unit decides that there are the first and second beacon groups.

8. The communication apparatus according to claim 1, wherein the predetermined amount is set such that the first and the second beacon groups are considered to be in synchronization with each other.

9. A control method for controlling a communication apparatus which forms a beacon group to perform communication, comprising:
   an acquisition step of acquiring an offset amount between beacon periods of a first beacon group and a second beacon group, wherein the first and the second beacon groups are generated due to the communication apparatus entering a hibernation status, wherein the first beacon group is generated by a first device and the second beacon group is generated by a second device, and wherein the first and the second beacon groups are independent from each other,
   a determination step of determining a hibernation period such that an offset amount between beacon periods of the first and the second beacon groups does not exceed a predetermined amount during execution of hibernation on a basis of the acquired offset amount acquired in the acquisition step; and a hibernation step of placing the communication apparatus in the hibernation status in accordance with the hibernation period determined in the determination step.

10. A computer-readable storage medium retrievably storing a computer program for causing a computer to execute the method according to claim 9.

* * * * *